Patented Oct. 4, 1949

2,483,969

UNITED STATES PATENT OFFICE 2,483,969

ACYL POLYALKYLENE-POLYAMINE BIGUANIDES

Ferdinand J. Gajewski, Linden, N. J., assignor to General Aniline & Film Corporation, New York, N. Y., a corporation of Delaware No Drawing. Application July 2, 1947, Serial No. 758,718

10 Claims. (Cl. 260—404.5)

This invention relates to novel condensation products obtained by reacting an acyl polyalkylene-polyamide (which, in turn, may be produced by condensing a polyalkylene-polyamine with an aliphatic carboxylic acid) with dicyandiamide and a method of producing the same. It has been found that these novel products are valuable textile auxiliary materials which are useful in the treatment of textile fibers, particularly those of vegetable origin, cotton, viscose, rayon, cellulose acetate, etc. in order to serve as dye-fixing agents and to impart a soft handle or feel to the cloth.

These novel products may be represented by the following probable general formula:

wherein R represents an aliphatic hydrocarbon radical (preferably one containing at least 9 carbon atoms and which may contain one or more double bonds and may be substituted by hydroxy groups; that is, the grouping R—CO— stands for the acyl radical of a saturated or unsaturated fatty acid or hydroxy fatty acid), R' and R" stand for hydrogen or methyl, $x$ is an integer greater than 1 (i. e. 2, 3 or 4), and Y stands for the group —NH₂ or

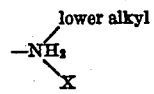

wherein X stands for halogen or the group —OSO₃—lower alkyl.

As indicated above, these products may be obtained by first condensing a fatty acid with a polyalkylene-polyamine and thereafter reacting the thus-obtained acyl polyalkylene-polyamine with dicyandiamide. The thus-obtained acyl polyalkylene-polyamine biguanide may then be used directly for the treatment of textile materials. However, most of these biguanides are relatively water-insoluble and in order to facilitate their use, it is preferable to incorporate a water-solubilizing group into the molecule. These products may advantageously be water-solubilized by reacting them with a neutral lower alkyl inorganic acid ester, such as methyl chloride, ethyl iodide, or dimethyl or diethyl sulfate.

In order to facilitate the present description, the preparation of the novel compounds of the present invention employing stearic acid, diethylene triamine, dicyandiamide and dimethyl sulfate as reactants, is illustrated by the following formulas below:

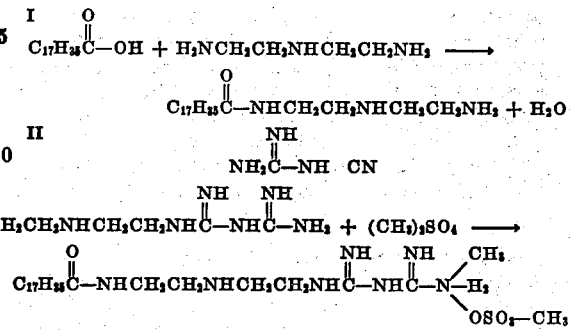

The acyl polyalkylene-polyamine formed as indicated in Equation I above, may advantageously be prepared in the manner described in U. S. Patent No. 1,947,951 to Neelmeier et al., by reacting a higher fatty acid, for instance stearic acid illustrated in the equation or lauric acid, palmitic acid, oleic acid, ricinoleic acid, etc., for example, with a polyalkylene-polyamine such as the diethylene - triamine illustrated or triethylene-tetramine, dipropylene-triamine and the like, by mixing either the free acid or an ester (including glycerides) thereof with a polyalkylene-polyamine and heating, preferably to 150° to 210° C. in order to complete the reaction. Any excess of base and any alcohol formed may be removed after completion of the reaction by distillation under reduced pressure. While it is preferred to employ a higher fatty acid (i. e. one which contains at least 10 carbon atoms) in the formation of the acyl polyalkylene-polyamines in step 1 illustrated by Equation I above (since it has been found that the novel products of this invention which are produced when such higher fatty acids are employed have the property of imparting a soft handle or feel to textile materials treated therewith), it is possible to employ a lower fatty acid, for instance acetic, propionic or butyric acid, in place of such higher fatty acid. In this case, the novel products of the present invention, while they do not impart soft handle or feel to the textile materials treated therewith, do have the property of serving as dye-fixing agents.

The thus-obtained acyl polyalkylene-polyamine either as such or in the form of its salt with such acids as hydrochloric, sulfuric and phosphoric acid, is then reacted with dicyandiamide, as illustrated in Equation II above. This reaction may advantageously be carried out by heating a mixture of the two reactants or, if desired, may be carried out in the presence of an inert solvent, for instance, an aqueous alcoholic solution, at a temperature of from say 90° C. to 160° C. In most cases it is not necessary to isolate the products obtained in this reaction, since they may be employed directly in the condition in which they are produced. The thus-obtained biguanide is a valuable textile-treating material but is, as previously indicated, insufficiently water-soluble to be applied readily without the use of emulsifying agents and the like.

In order to facilitate the use of these biguanides, it is preferable to subject them to a water-solubilizing step and it has been found that they may be readily water-solubilized by treatment with a neutral lower alkyl inorganic acid ester, for instance, dimethyl sulfate or diethyl sulfate, as indicated in Equation III above. When so treated, the acyl polyalkylene-polyamine biguanides of the present invention are sufficiently water-soluble to permit their use as textile-treating agents in an aqueous solution and when so applied serve as dye-fixing agents on textile fabrics treated therewith and in the case of products produced from higher fatty acids impart a soft handle or feel to the treated fabric.

The following specific examples are illustrative of preferred methods of producing the acyl polyalkylene-polyamine biguanides of this invention:

Example 1

Equal parts by weight of stearic acid and diethylene triamine were heated at 200–210° C. until a test of the reaction product was soluble in dilute hydrochloric acid. The excess diethylene triamine was then distilled off under vacuum. The resulting acyl polyalkylene-polyamine was converted to the hydrochloride by addition of dilute HCl and was then refluxed with an equimolar portion of dicyandiamide in methanol for 12 hours. The resultant acyl polyalkylene-polyamine biguanide was then recovered by distilling off the methanol.

This material was then applied to cotton cloth as 0.25% to 2% aqueous solutions and dispersions, the dispersions being prepared by dispersing the acyl polyalkylene-polyamine biguanide in water, using a water-soluble polyglycol ether of octyl phenol as the dispersing agent, while for the preparation of the solutions the acyl polyalkylene-polyamine biguanide was reacted with an equimolar proportion of dimethyl sulfate by heating a mixture thereof as indicated in Equation III above. Cotton cloth was then padded with these dispersions and solutions to 50% to 100% pickup of the solution and then dried either in the air or by baking in an oven at 120° C.

Both dyed and undyed samples of cloth were treated as above described and in all cases the material imparted a soft feel to the cloth. It also served to fix the dye on the cloth, both in the case of cloth that had been dyed before this treatment and also in the case of cloth which was dyed after this treatment.

Example 2

Equimolecular quantities of stearic acid and diethylene triamine are slowly heated to 180° C. The temperature is maintained until a sample is soluble in dilute mineral or organic acid such as acetic acid. The temperature is dropped to 100° C. and a one (1) mol equivalent of dicyandiamide is added. The temperature is raised to 120–125° C. and kept there for 12–24 hours. The reaction mixture is cooled below 100° C. and an equal weight of water is added. Then at 80–90° C. a molecular equivalent of dimethyl sulfate is added and stirred until a sample is soluble in water.

This material was then applied to cotton cloth, as described in Example 1 and was similar in its action thereon to the material of that example.

I claim:

1. Acyl polyalkylene-polyamine biguanides of the general formula:

$$R-\overset{O}{\underset{\|}{C}}-NH\{CHR'-CHR''-NH\}_x-CNH-NH-CNH-NH_2$$

wherein R is the residue of a fatty acid, R' and R'' stand for a member of the group consisting of hydrogen and methyl, $x$ stands for an integer greater than 1.

2. Acyl polyalkylene-polyamine biguanides of the general formula:

$$R-\overset{O}{\underset{\|}{C}}-NH\{CHR'-CHR''-NH\}_x-CNH-NH-CNH-NH_2$$

wherein R is the residue of a higher fatty acid, R' and R'' stand for a member of the group consisting of hydrogen and methyl, $x$ stands for an integer greater than 1.

3. Acyl polyalkylene-polyamine biguanides of the general formula:

$$R-\overset{O}{\underset{\|}{C}}-NH\{CH_2-CH_2-NH\}_x-CNH-NH-CNH-NH_2$$

wherein R is the residue of a fatty acid, $x$ stands for an integer greater than 1.

4. Acyl polyalkylene-polyamine biguanides of the general formula:

$$R-\overset{O}{\underset{\|}{C}}-NH\{CH_2-CH_2-NH\}_x-CNH-NH-CNH-NH_2$$

wherein R is the residue of a higher fatty acid, $x$ stands for an integer greater than 1.

5. An acyl polyalkylene-polyamine biguanide of the formula:

$$C_{17}H_{35}\overset{O}{\underset{\|}{C}}-NH-CH_2-CH_2-NH-CH_2-CH_2-NH-CNH-NH-CNH-NH_2$$

6. An acyl polyalkylene-polyamine biguanide of the formula:

$$C_{17}H_{35}\overset{O}{\underset{\|}{C}}-NH-CH_2-CH_2-NH-CH_2-CH_2-NH-CNH-NH-CNH-N\begin{smallmatrix}CH_3\\H_2\\OSO_3-CH_3\end{smallmatrix}$$

7. Acyl polyalkylene-polyamine biguanides of the general formula:

$$R-\overset{O}{\underset{\|}{C}}-NH\{CHR'-CHR''-NH\}_x-CNH-NH-CNH-N\overset{lower\ alkyl}{\underset{X}{\diagdown}}H_2$$

wherein R is the residue of a fatty acid, R' and R'' stand for a member of the group consisting of hydrogen and methyl, $x$ stands for an integer greater than 1, and X stands for a member of the group consisting of halogen and the group —OSO₃—lower alkyl.

8. Acyl polyalkylene-polyamine biguanides of the general formula:

$$R-\overset{O}{\underset{\|}{C}}-NH\{CHR'-CHR''-NH\}_x-CNH-NH-CNH-N\overset{lower\ alkyl}{\underset{X}{\diagdown}}H_2$$

wherein R is the residue of a higher fatty acid, R' and R'' stand for a member of the group consisting of hydrogen and methyl, $x$ stands for an integer greater than 1, and X stands for a member of the group consisting of halogen and the group —OSO₃—lower alkyl 9. Acyl polyalkylene-polyamine biguanides of the general formula:

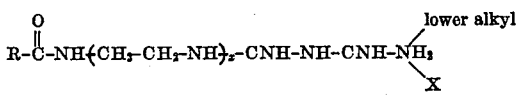

wherein R is the residue of a fatty acid, $x$ stands for an integer greater than 1, and X stands for a member of the group consisting of halogen and the group —$OSO_3$—lower alkyl.

10. Acyl polyalkylene-polyamine biguanides of the general formula:

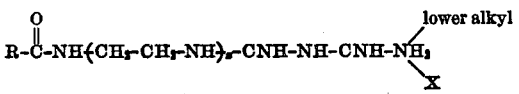

wherein R is the residue of a higher fatty acid, $x$ stands for an integer greater than 1, and X stands for a member of the group consisting of halogen and the group —$OSO_3$—lower alkyl.

FERDINAND J. GAJEWSKI.

REFERENCES CITED

The following references are of record in the file of this patent:

UNITED STATES PATENTS

| Number | Name | Date |
|---|---|---|
| 1,947,951 | Neelmeier et al. | Feb. 20, 1934 |
| 2,191,738 | Balle | Feb. 27, 1940 |
| 2,433,542 | Binkler et al. | Dec. 30, 1947 |